US010043079B2

(12) United States Patent
Kim et al.

(10) Patent No.: US 10,043,079 B2
(45) Date of Patent: Aug. 7, 2018

(54) METHOD AND APPARATUS FOR PROVIDING MULTI-VIDEO SUMMARY

(71) Applicant: Hanwha Techwin Co., Ltd., Changwon-si (KR)

(72) Inventors: Jisung Kim, Changwon-si (KR); Youngmin Baek, Changwon-si (KR); Jeongeun Lim, Changwon-si (KR); Eunji Choi, Changwon-si (KR); Daehwan Kim, Changwon-si (KR); Hwalsuk Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 264 days.

(21) Appl. No.: 14/996,303

(22) Filed: Jan. 15, 2016

(65) Prior Publication Data

US 2016/0210516 A1 Jul. 21, 2016

(30) Foreign Application Priority Data

Jan. 15, 2015 (KR) .................. 10-2015-0007449

(51) Int. Cl.
| *H04N 7/18* | (2006.01) |
| *H04N 9/80* | (2006.01) |
| *G06K 9/00* | (2006.01) |
| *G11B 27/031* | (2006.01) |

(52) U.S. Cl.
CPC ..... *G06K 9/00751* (2013.01); *G06K 9/00261* (2013.01); *G06K 9/00771* (2013.01); *G11B 27/031* (2013.01); *H04N 7/181* (2013.01); *G06K 2209/27* (2013.01)

(58) Field of Classification Search
CPC ............... H04N 5/44591; H04N 7/181; G06K 9/00751; G06K 9/00228; G11B 27/3081; G11B 27/34
See application file for complete search history.

(56) References Cited

U.S. PATENT DOCUMENTS

| 8,831,281 | B2* | 9/2014 | Shellshear | ......... G06K 9/00751 382/103 |
| 9,167,176 | B2 | 10/2015 | Winter et al. | |
| 9,792,362 | B2* | 10/2017 | Park | .................. G06F 17/30837 |
| 2003/0053658 | A1* | 3/2003 | Pavlidis | ............. G06K 9/00335 382/103 |
| 2006/0117356 | A1* | 6/2006 | Jojic | .................. G06F 17/30811 725/88 |
| 2013/0188054 | A1* | 7/2013 | Weinblatt | ................. H04N 7/18 348/159 |
| 2015/0381902 | A1* | 12/2015 | Bao | ........................ H04N 7/147 348/14.07 |

FOREIGN PATENT DOCUMENTS

| JP | 4980606 B2 | 7/2012 |
| KR | 100876494 B1 | 12/2008 |
| KR | 1020130061058 A | 6/2013 |
| KR | 1020130083939 A | 7/2013 |

* cited by examiner

*Primary Examiner* — Tsion B Owens
(74) *Attorney, Agent, or Firm* — Sughrue Mion, PLLC

(57) ABSTRACT

An apparatus for providing a multi-video summary provides video summaries of a single object seen from different angles, the video summaries being generated based on videos of an overlapping area captured by a plurality of imaging devices in different field of views (FOVs). The overlapping area is an area where monitoring areas of the plurality of imaging devices overlap one another.

18 Claims, 18 Drawing Sheets

FIG. 4

| | OVERLAPPING CAMERAS | DETECTED OBJECT | TIME STAMP | | |
|---|---|---|---|---|---|
| FIRST OVERLAPPING AREA (S110) | SECOND CAMERA (120) | – | – | – | – |
| | THIRD CAMERA (130) | – | – | – | – |
| SECOND OVERLAPPING AREA (S120) | THIRD CAMERA (130) | ID1 | t1 (10,100) | t2 (10,90) | t3 (10,90) |
| | FOURTH CAMERA (140) | ID27 | t1 (20,100) | t2 (20,90) | t3 (20,90) |

METHOD AND APPARATUS FOR PROVIDING MULTI-VIDEO SUMMARY

CROSS-REFERENCE TO THE RELATED APPLICATION

This application claims priority from Korean Patent Application No. 10-2015-0007449, filed on Jan. 15, 2015, in the Korean Intellectual Property Office, the disclosure of which is incorporated herein in its entirety by reference.

BACKGROUND

1. Field

Apparatuses and methods consistent with exemplary embodiments relate to simultaneously providing a multi-video summary about a certain object via images captured by a plurality of imaging devices.

2. Description of the Related Art

A network video surveillance system allows a user to monitor various environments such as roads, buildings, factories, etc. for certain purposes, such as security reasons, via video recording apparatuses such as network cameras.

The network video surveillance system may receive, via a transmission network, a video captured by a monitoring camera. A user may directly monitor security circumstances through a monitor or store the video in a digital video recorder (DVR), network video recorder (NVR), or VMS format and search through the stored video later.

However, when such a network video surveillance system is used, a user may not be able to directly monitor required areas and analyze captured videos due to use of an increased number of monitoring cameras. Also, a time for searching through stored videos may rapidly increase depending on the number of monitoring cameras. Accordingly, there is a need for a new search technology, and thus, a video synopsis/summary technology has been developed.

The video summary technology may be used to summarize a long video and provide a compressed video so that a user may efficiently search a video.

SUMMARY

When it is difficult to recognize a person's face in a video provided by an imaging apparatus such as a monitoring camera, videos captured by nearby cameras have to be manually examined to identify the victim's face.

According to exemplary embodiments of the inventive concept, during a process of identifying the person's face in a video provided by a monitoring camera or the like, a video summary generated based on videos captured by nearby cameras in an identical time range are simultaneously used. Search correctness and efficiency may be improved by simultaneously providing a video summary in which a captured object is disclosed from various angles.

Additional aspects will be set forth in part in the description which follows and, in part, will be apparent from the description, or may be learned by practice of the presented exemplary embodiments.

According to one or more exemplary embodiments, there is provided a method of providing a multi-video summary which may include: setting up a plurality of imaging devices to monitor, in different field of views (FOVs), a plurality of areas including at least one overlapping area commonly monitored by the imaging devices, and capture a plurality of videos from the areas, respectively; storing overlapping information in which the imaging devices and the overlapping area are mapped to one another to indicate that objects respectively detected in the overlapping area by the imaging devices are identical to one another; and providing at least two video summaries which are generated from the videos and display at least two images of the identical object in the overlapping area captured by at least two imaging devices among the imaging devices in the different FOVs, based on the overlapping information.

The providing the two video summaries may include displaying, on a single screen of a display, the two video summaries which respectively show at least one image of the object detected in the overlapping area, the two video summaries being generated from at least two videos captured by the two imaging devices. When the two video summaries are displayed on the single screen, the two video summaries may be synchronized in time to indicate that an image of the object shown in a first video summary and an image of the object shown in a second video summary are captured at a same time.

The above method may further include: displaying, on a single screen of a display, a first video summary which shows a plurality of images of the object detected in the overlapping area by a first imaging device with a first FOV; and displaying at least one second video summary including at least one second image of the object detected in the overlapping area by at least one second imaging device with at least one second FOV, in response to selecting at least one image of the first images or indication of the image of the first images. The selected image of the first images and the second image may have been captured by the first imaging device and the second imaging device, respectively, at the same time.

The above method may further include indicating presence of the second image of the object captured by the second imaging device in a storage when the first video summary is displayed. The presence of the second image may be indicated by at least one of information about a number of the second imaging device that captures a video of the overlapping area and information about identifiers of the second imaging device that captures the video of the overlapping area.

The above method may also further include, in response to selecting an image included in a first video summary of the two video summaries, displaying an original video among the videos, corresponding to the image, captured by a first imaging device among the imaging devices.

According to one or more exemplary embodiments, there is provided a multi-video summary providing apparatus which may include: an FOV information storage configured to store information about at least one overlapping area commonly monitored by a plurality of imaging devices among a plurality of areas monitored by the imaging devices having different FOVs about the overlapping area; a mapping unit configured to store overlapping information in which the imaging devices and the overlapping area are mapped to one another to indicate that objects respectively detected in the overlapping area by the imaging devices are identical to one another; and a multi-video summary provider configured to provide at least two video summaries which are generated from the videos and display at least two images of the identical object in the overlapping area captured by at least two imaging devices among the imaging devices at the different FOVs, based on the overlapping information.

The multi-video summary provider may be configured to display, on a single screen of a display, a first video summary which shows a plurality of images of the object detected in the overlapping area by a first imaging device with a first FOV, and at least one second video summary including at least one second image of the object detected in the overlapping area by at least one second imaging device with at least one second FOV, in response to at least one image of the first images or indication of the image of the first images.

BRIEF DESCRIPTION OF THE DRAWINGS

These and/or other aspects will become apparent and more readily appreciated from the following description of the exemplary embodiments, taken in conjunction with the accompanying drawings, in which:

FIG. 4 is a table of data stored in a mapping unit, according to an exemplary embodiment;

DETAILED DESCRIPTION OF THE EXEMPLARY EMBODIMENTS

Figure 1:
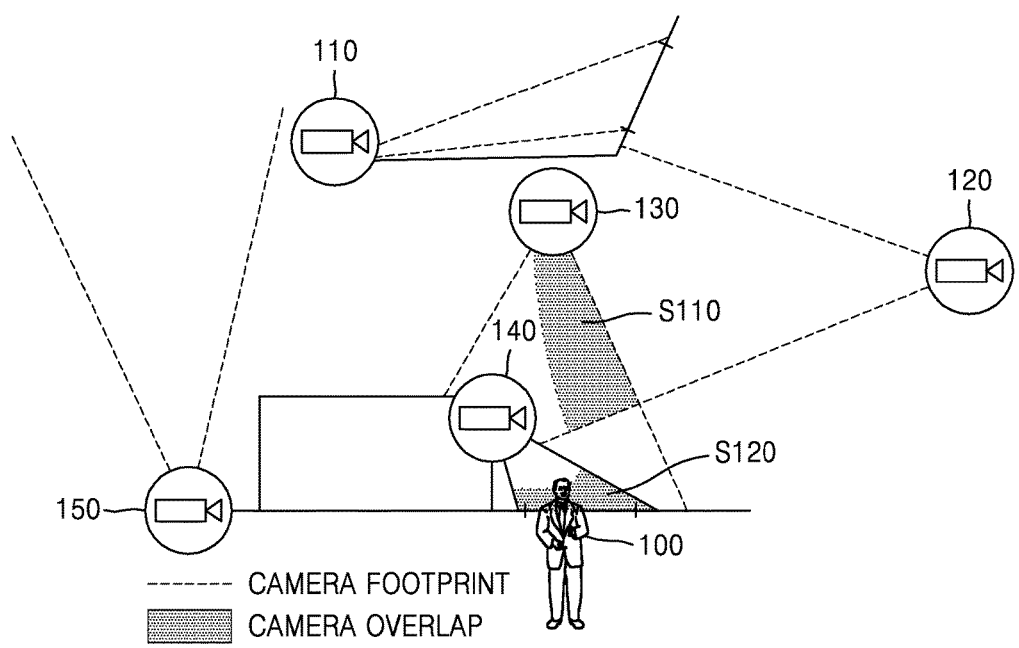
FIG. 1 is a plurality of imaging devices installed in a predetermined area, according to an exemplary embodiment.

As the inventive concept allows for various changes and numerous exemplary embodiments, particular exemplary embodiments will be illustrated in the drawings and described in the written description. The effect and features of the inventive concept and the method of realizing the effect and the features will be clear with reference to the exemplary embodiments described below with reference to the drawings. However, the inventive concept may be embodied in various forms and should not be construed as being limited to the exemplary embodiments presented herein. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to the exemplary embodiments which are illustrated in the accompanying drawings, wherein like reference numerals refer to like elements throughout.

Figure 2:
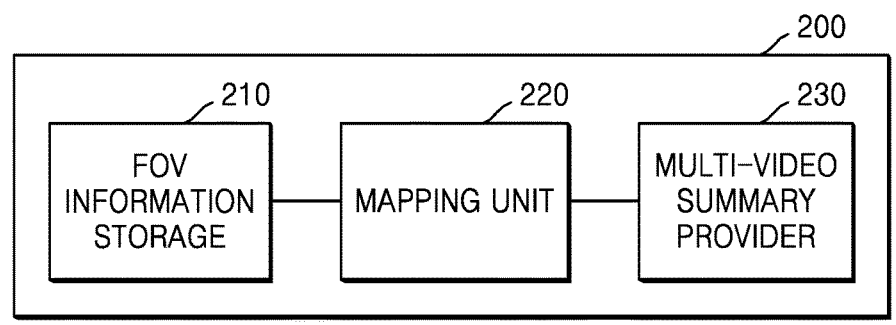
FIG. 2 is a block diagram of a multi-video summary provider, according to an exemplary embodiment.

FIG. 1 is a plurality of imaging devices installed in a predetermined areas, respectively, according to an exemplary embodiment. FIG. 2 is a block diagram of a multi-video summary providing apparatus 200, according to an exemplary embodiment.

Referring to FIGS. 1, 2 and 4, a configuration of the multi-video summary providing apparatus 200 is as below.

The multi-video summary providing apparatus 200 may store input video received wirelessly or via wires from a network camera or an external imaging device, and may reproduce the stored input video. When reproducing the input video, the multi-video summary providing apparatus 200 may simultaneously provide a video summary of the reproduced input video according to a user's request.

The multi-video summary providing apparatus 200 may receive videos from a plurality of network cameras through a plurality of channels and display the videos on a single screen of a display device (not shown). The multi-video summary providing apparatus 200 may perform wireless and wired communication with the plurality of network cameras. Also, respective video summaries of the plurality of videos may be displayed on the screen.

According to an exemplary embodiment, the multi-video summary providing apparatus 200 may provide a plurality of video summaries based on videos with respect to a single object captured by using a plurality of imaging devices. To do so, the multi-video summary providing apparatus 200 may include a field of view (FOV) information storage 210, a mapping unit 220 and a multi-video summary provider 230.

When respective monitoring areas monitored by a plurality of imaging devices 110, 120, 130, 140 and 150 are partially overlapping, the FOV information storage 210 stores overlapping area information S110 and S120. The FOV information storage 210 may detect respective FOVs of the imaging devices 110, 120, 130, 140 and 150 to establish relationships between views of the same object in imaging devices 110, 120, 130, 140 and 150, and thus detect the respective monitoring areas of the imaging devices 110, 120, 130, 140 and 150. The relationships between the views of the same object are established by matching geometric and appearance features.

Referring to FIG. 1, a first overlapping area S110 between a second camera 120 and a third camera 130 and a second overlapping area S120 between a third camera 130 and a fourth camera 140 are detected.

Referring to FIGS. 2 and 4, with regard to at least one of the overlapping areas S110 and S120 stored in the FOV information storage 210, the mapping unit 220 may map information about at least two imaging devices that capture the overlapping areas S110 and S120. According to an exemplary embodiment, the mapping unit 220 may store a database as shown in FIG. 4.

The mapping unit 220 may map information which indicates that an area captured by the second camera 120 partially overlaps an area captured by the third camera 130 in the first overlapping area S110. Also, the mapping unit 220 may map information which indicates that an area captured by the third camera 130 partially overlaps an area captured by the fourth camera 140 in the second overlapping area S120.

According to an exemplary embodiment, when the multi-video summary providing apparatus 200 detects movement of a person 100 in the second overlapping area S120, the multi-video summary providing apparatus 200 may use the information of the mapping unit 220 as shown in the exemplary embodiment of FIG. 4.

Referring to FIG. 4, the multi-video summary providing apparatus 200 may use information indicating that an object ID1 is detected by the third camera 130 at a calibration (10,100) in the second overlapping area S120 at time t1, and that an object ID27 is detected by the fourth camera 140 at a calibration (20,100) in the second overlapping area S120 at the time t1.

In this case, based on the information of the mapping unit 220, the multi-video summary providing apparatus 200 may recognize that the object ID1 detected by the third camera 130 at the calibration (10,100) at the time t1 is the same as the object ID27 detected by the fourth camera 140 at the calibration (20,100) at the time t1.

In this case, the multi-video summary providing apparatus 200 may map the object ID1 detected by the third camera 130 and the object ID27 detected by the fourth camera 140 as an identical object. The multi-video summary providing apparatus 200 may use mapping of objects as mapping information.

Also, the multi-video summary providing apparatus 200 may map the calibration (10,100) detected by the third camera 130 and the calibration (20,100) detected by the fourth camera 140 as an identical calibration. The multi-video summary providing apparatus 200 use mapping of calibration information as mapping information.

The multi-video summary providing apparatus 200 may also map and store calibration information in advance based on information of respective FOVs of the third and fourth cameras 130 and 140.

According to an exemplary embodiment, the mapping unit 220 may additionally map and store time stamp information. For example, when movement of a person ID1 (corresponds to the person 100 of FIG. 1) is detected at a location A in the second overlapping area S120 at time t3, some or all of time stamp information, overlapping area information, and information of a plurality of imaging devices that capture overlapping areas may be mapped, stored, and managed. An exemplary embodiment of mapping information is as below.

(t3, second overlapping area, third camera (10, 90), fourth camera (20, 90))

When movement of a person is detected by the third camera at coordinates (10,90) at time t3 based on the mapping information according to the above exemplary embodiment, the multi-video summary providing apparatus 200 may use information of a video of coordinates (20,90) captured by the fourth camera at the time t3 based on the mapping information.

According to an exemplary embodiment, the mapping unit 220 may map the person 100 that is set to an identification code ID_1 in the third camera 130 and the person 100 that is set to an identification code ID_27 in the fourth camera 140, and recognize that ID_1 and ID_27 indicate an identical object.

According to an exemplary embodiment, based on the mapping information of the mapping unit 220, the multi-video summary provider 230 may simultaneously display video summaries that are generated by using videos of an overlapping area captured by different imaging devices in different FOVs. Also, based on the mapping information, the multi-video summary provider 230 may further include a user interface (not shown) that allows the user to select a video summary of an imaging device (e.g., the fourth camera) from among the plurality of imaging devices that has captured the same object as another imaging device (e.g., the third camera) at the time t3.

In particular, based on the time stamp information and videos of the second overlapping area S120 captured by the third and fourth cameras 130 and 140, the multi-video summary provider 230 may be configured to simultaneously or sequentially reproduce a video summary of the second overlapping area S120 generated by the third camera 130 and a video summary of the second overlapping area S120 generated by the fourth camera 140. In this case, a user interface for selection may be provided to the user.

Figure 5:
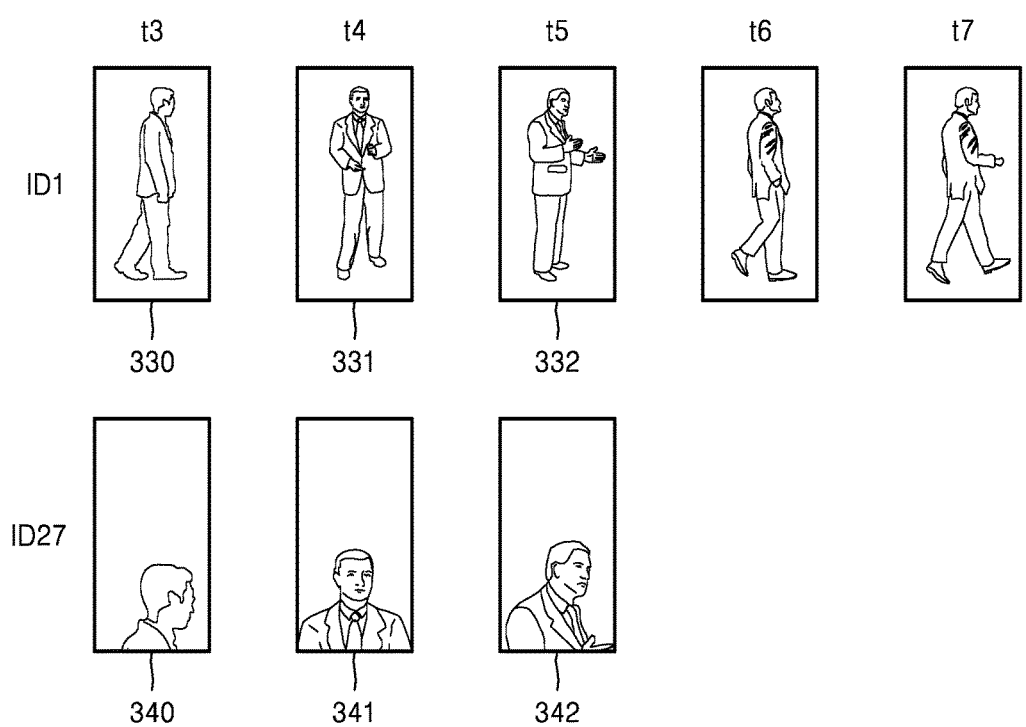
FIGS. 5 to 14 are diagrams of a multi-video summary, according to exemplary embodiments.
Figure 6:
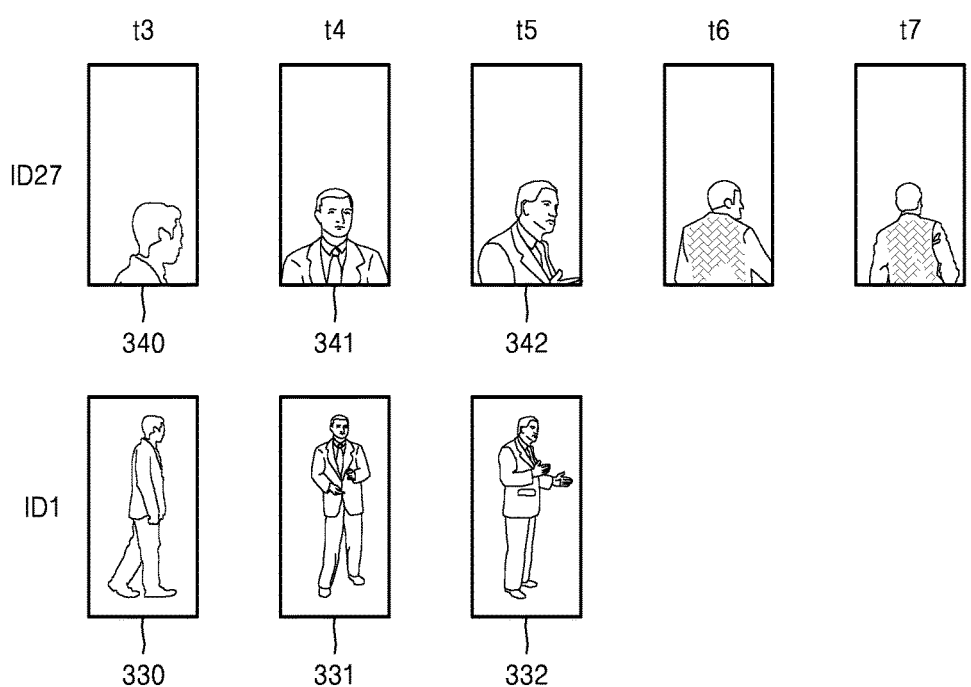

According to an exemplary embodiment, when providing a video summary, the multi-video summary provider 230 may be configured to simultaneously display videos of an overlapping area captured by a plurality of cameras, as in exemplary embodiments of FIGS. 5 and 6.

Figure 7:
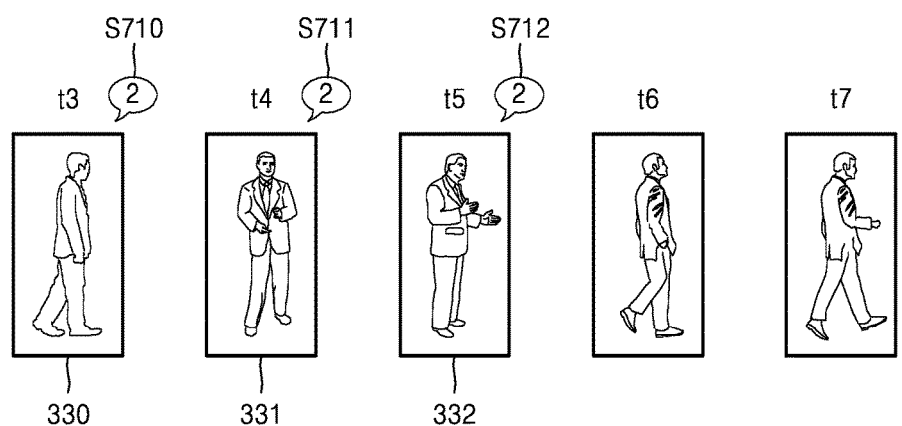

According to another exemplary embodiment, when providing a video summary, the multi-video summary provider 230 may be configured to display a video summary of a video captured by a predetermined camera, and display, on the video summary, notification messages S710, S711 and S712 which indicate that a video captured from an overlapping area by another camera exists, as shown in FIG. 7.

Figure 8:
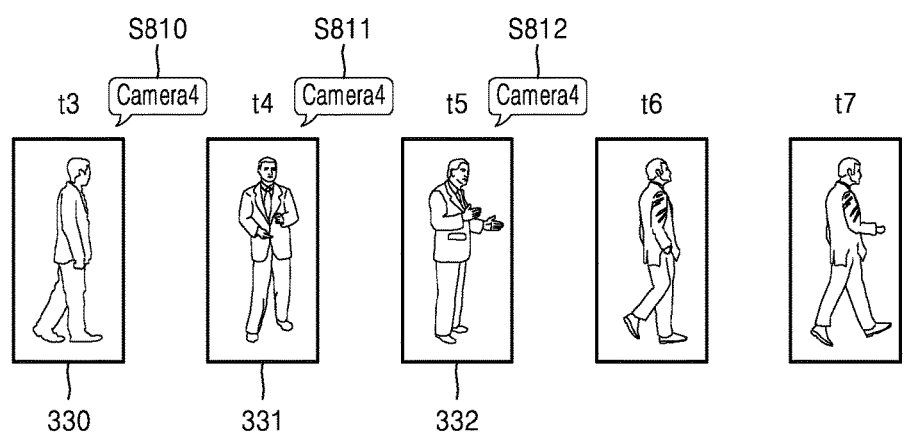

According to another exemplary embodiment, when providing a video summary, the multi-video summary provider 230 may be configured to display only a video summary of a video captured by a predetermined camera, and display, on the video summary, notification messages S810, S811 and S812 which indicate that a video captured from the overlapping area by another camera exists, as shown in FIG. 8.

In this case, the notification messages S710, S711, S712, S810, S811, and S812 may include at least one of information S710, S711, and S712 about the number of other cameras that capture videos of the overlapping area, and information S810, S811 and S812 about identifiers (IDs) of the other cameras that capture the videos of the overlapping area.

Exemplary embodiments of displaying a multi-video summary will be described as below with reference to FIGS. 3 and 5 to 14.

Figure 3:
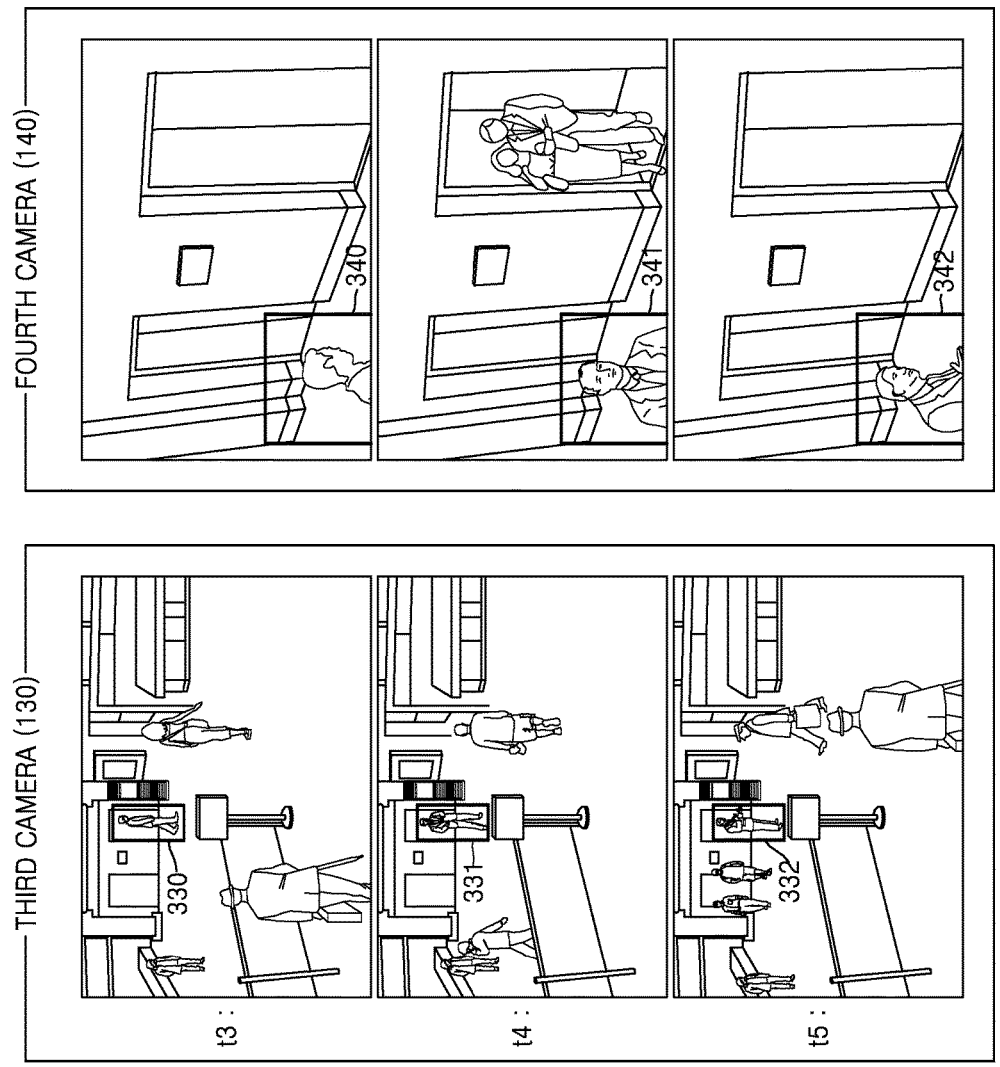
FIG. 3 is a diagram of a video summary generated using images of an area captured by a plurality of imaging devices with a matching field of view (FOV), according to an exemplary embodiment.

FIG. 3 shows images of a video captured by the third camera 130, in which a person 330 takes out a bomb from a bag and cautiously throws away the bomb in a garbage bin at a public place. The problem is that the face of the person 330 is too small in the video captured by the third camera 130, and thus information may be unclear or it may be difficult to identify the person 330. In this case, according to the related art, videos captured by nearby cameras may be manually searched to find facial information about the person 330 captured by the third camera 130, which may take a long time and the results may be incorrect. These problems are addressed by the present exemplary embodiment.

Referring to FIG. 3, the person 330 is detected once by the third camera 130 (of FIG. 1) at the time t3, and an area where the person 330 is detected overlaps an area captured by the fourth camera 140 (of FIG. 1).

According to exemplary embodiments of FIGS. 5 to 10, a face of the person 330 captured by the third camera 130 may be provided as a video summary, simultaneously with another video summary made from a video clip captured by the fourth camera 140, which also captured a face of the person 330 in the overlapping area. Two video summaries may be provided simultaneously by default or according to a user preference setting. Therefore, even when the face of the person 330 cannot be clearly identified via the third camera 130, the user does not have to additionally search but may refer to a video captured in another FOV by the fourth camera 140. As a result, a search time may be reduced and search accuracy may be improved.

According to exemplary embodiments of FIGS. 5 to 10, a multi-video summary providing apparatus simultaneously displays video summaries that are generated by using videos captured by the imaging devices 130 and 140 as shown in FIG. 3. FIGS. 5 to 10 illustrate examples of a multi-video summary providing apparatus providing a multi-video summary of a predetermined object.

Referring to FIG. 3, the person 330 captured by the third camera 130 (of FIG. 1) at the time t3 is too small to be recognized. According to an exemplary embodiment, in order to address this situation, the multi-video summary providing apparatus may simultaneously display a video summary of an overlapping area provided by other imaging devices.

Referring to FIG. 5, the third camera 130 may write a video summary of a person at times t3, t4, t5, t6 and t7. In this case, when the person (corresponds to 330, 331 and 332 of FIG. 3) is in an area overlapping a captured area of the fourth camera 140, a video summary of the time t3 (340 of FIG. 5), the time t4 (341 of FIG. 5) and the time t5 (342 of FIG. 5) at which the person is captured by the fourth camera 140, as shown in FIG. 5, may be simultaneously displayed.

In particular, the person 330 captured at the time t3 by the third camera 130 (of FIG. 1) may be simultaneously displayed with a video 340 of the person 330 captured by the fourth camera 140 (of FIG. 1) at an identical time range and an identical location but in a different FOV.

A person 331 captured by the third camera 130 (of FIG. 1) at the time t4 may be simultaneously displayed with a video 340 of the person 331 captured by the fourth camera 140 (of FIG. 1) at an identical time range and an identical location but in a different FOV.

Likewise, a person 332 captured by the third camera 130 (of FIG. 1) at the time t5 may be simultaneously displayed with a video 340 of the person 331 captured by the fourth camera 140 (of FIG. 1) at an identical time range and an identical location but in a different FOV.

Video summaries of different imaging devices may be simultaneously displayed by using the person 332 captured by the third camera 130 (of FIG. 1) at the time t5 and the person 342 captured by the fourth camera 140 (of FIG. 1) at an identical time range and an identical location but in a different FOV.

FIG. 7 shows a diagram of an interface showing the multi-video summary of FIG. 5, according to another exemplary embodiment. According to this exemplary embodiment, when displaying the multi-video summary, a video summary related to a person captured by the third camera 130 (of FIG. 1) may be displayed, and then, notification messages S710, S711, and S712 related to scenes 330, 331 and 332 in an overlapping area may be displayed along with videos.

The notification messages S710, S711 and S712 may be shown in talk bubbles or numbers around the videos. The user may see the numbers in the talk bubbles, and understand that the videos have been captured by other cameras at a corresponding time.

Figure 9:
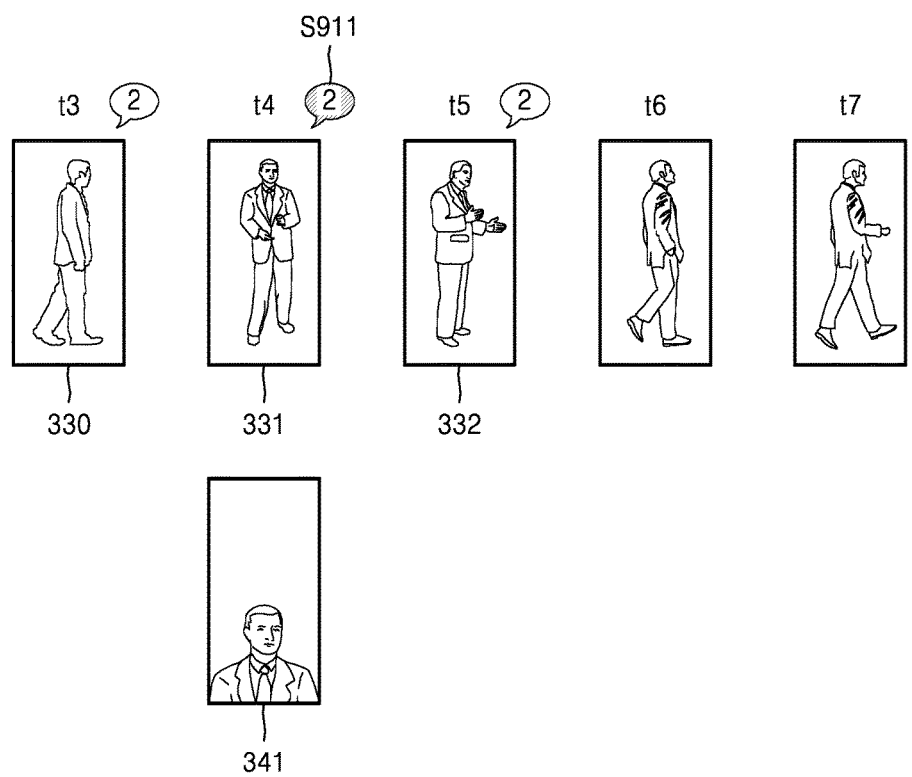

For example, when the number "2" is in a talk bubble, two cameras may be in an overlapping area. When the number "2" is clicked as shown in FIG. 9 (S911), two videos 331 and 341 may be displayed only on the video corresponding to the clicked number "2"(S911).

Figure 10:
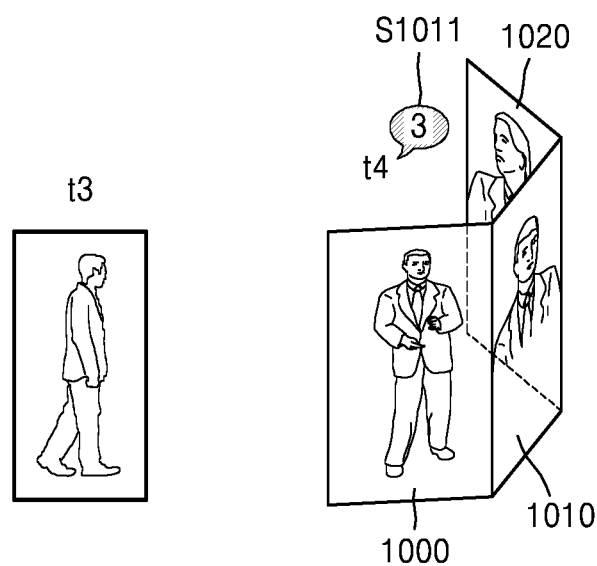

According to another exemplary embodiment, referring to FIG. 10, when the number "3" is in a talk bubble (S1011), three cameras may be in an overlapping area. When the number "3" is clicked (S1011), then all corresponding videos 1000, 1010, 1020 that are captured by three cameras may be displayed.

In this case, the three videos may be displayed by using various methods, for example, vertically displaying the three videos, horizontally displaying the three videos, displaying the three videos in a scroll view, 3-dimensionally displaying the three videos as illustrated in FIG. 10, and displaying the three videos as a mosaic.

FIG. 6 shows the fourth camera 140 (of FIG. 3) writing a multi-video summary of a predetermined person, according to another exemplary embodiment.

As described above with reference to FIG. 5, the fourth camera 140 may write video summaries of the predetermined person at the times t3, t4, t5, t6 and t7. In this case, when the predetermined person (340, 341 and 342 of FIG. 3) is included in an area overlapping a captured area of the third camera 130, as shown in FIG. 6, video summaries of the predetermined person captured by the third camera 130 at times t3 (see 330 of FIG. 6), t4 (see 331 of FIG. 6) and t5 (see 332 of FIG. 6) may be simultaneously displayed.

FIG. 8 shows the third camera 130 of FIG. 3 writing a multi-video summary of a predetermined person (340, 341, and 342 of FIG. 3), according to another exemplary embodiment.

A multi-video summary providing apparatus may receive a video from the third camera 130, and display the received video on a single screen. Also, a video summary of the received video may be displayed on the screen, separately or together with the original video.

In this case, the multi-video summary providing apparatus may display as in FIG. 8 such that only the video summary of the video captured by the third camera 130 is displayed. Also, the video summary of videos captured in an overlapping area may be displayed with information about at least one other camera (S810, S811 and S812) that captured the videos.

Although FIG. 8 shows information about a single camera (S810, S811 and S812), when a plurality of cameras capture an overlapping area, information about the plurality of cameras may all be displayed.

Figure 11:
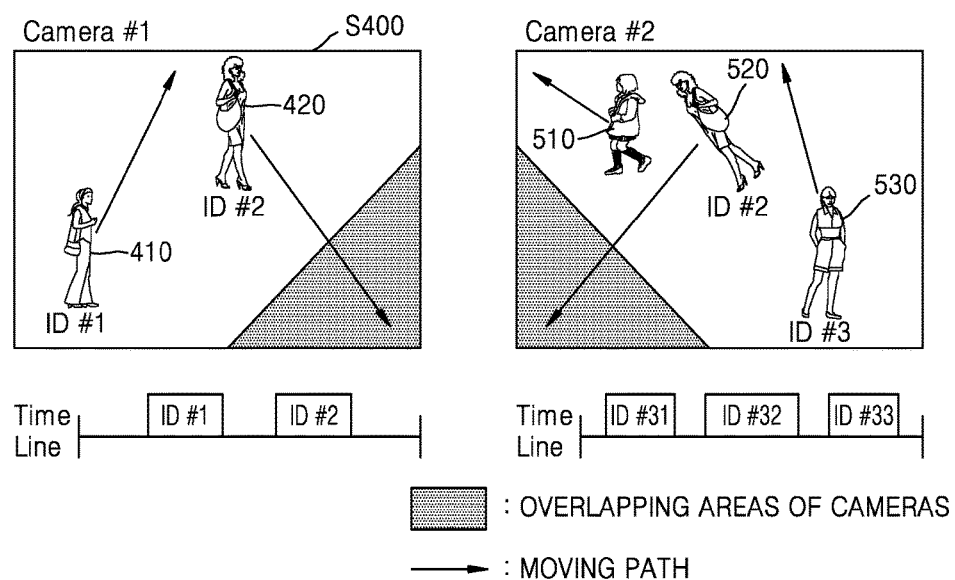

FIG. 11 shows video summaries according to an exemplary embodiment. FIG. 11 shows an exemplary embodiment of video summaries S400 and S410 respectively written based on videos respectively captured by a first camera (camera #1) and a second camera (camera #2).

The first camera first captures a person 410 with identification code 'ID#1' and sequentially captures a person 420 with identification code 'ID#2.'

Figure 12:
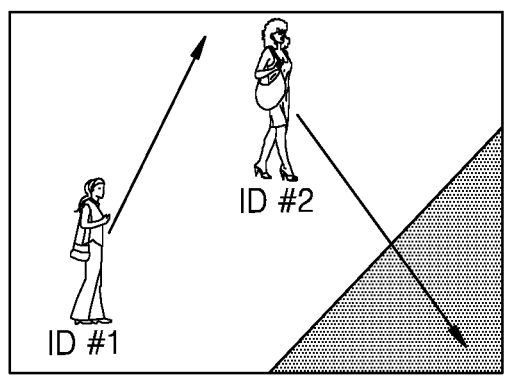
Figure 12:
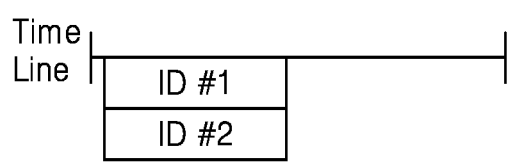

FIG. 12 shows an exemplary embodiment of a video summary of the video captured by the first camera, which simultaneously shows the person 410 with the identification code 'ID#1' and the person 420 with the identification code 'ID#2.'

Figure 13:
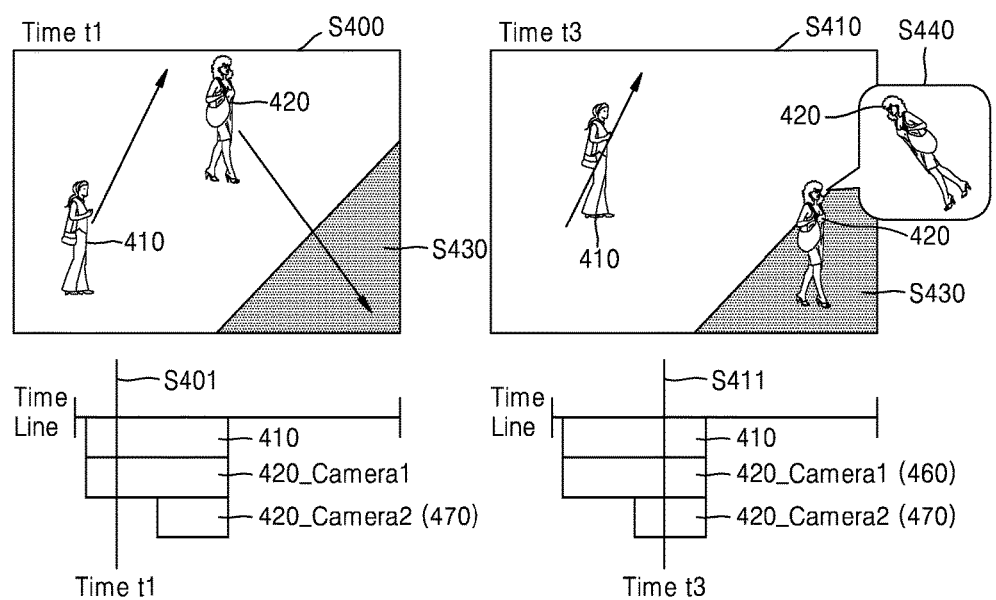

FIG. 13 shows a multi-video summary of the video captured by the first camera, according to an exemplary embodiment.

A video summary S400 written at time t1 is an exemplary embodiment in which an object is not detected from an overlapping area S430. In this case, the video summary S400 written by the first camera simultaneously displays a first object (ID#1) 410 and a second object (ID#27) 420 on a single screen.

A video summary S410 written at time t3 is an exemplary embodiment in which an object is detected from the overlapping area S430. In this case, the video summary S410 captured by the first camera may simultaneously display the first object (ID#1) 410 and the second object (ID#27) 420 on a single screen. Also, a video S440 of the second object 420 in the overlapping area S430 captured by the second camera may be displayed.

According to a timeline, at time t3, the first object 410 captured by the first camera, the second object 420 (460)

captured by the first camera, and the second object 420 (470) captured by the second camera may be simultaneously displayed on a single screen.

According to another exemplary embodiment, the video summary S410 written at the time t3 may display the first object (ID#1) 410, the second object (ID#27) 420, and a notification message 420 indicating that a video captured by another camera exists nearby the second object 420.

Figure 14:
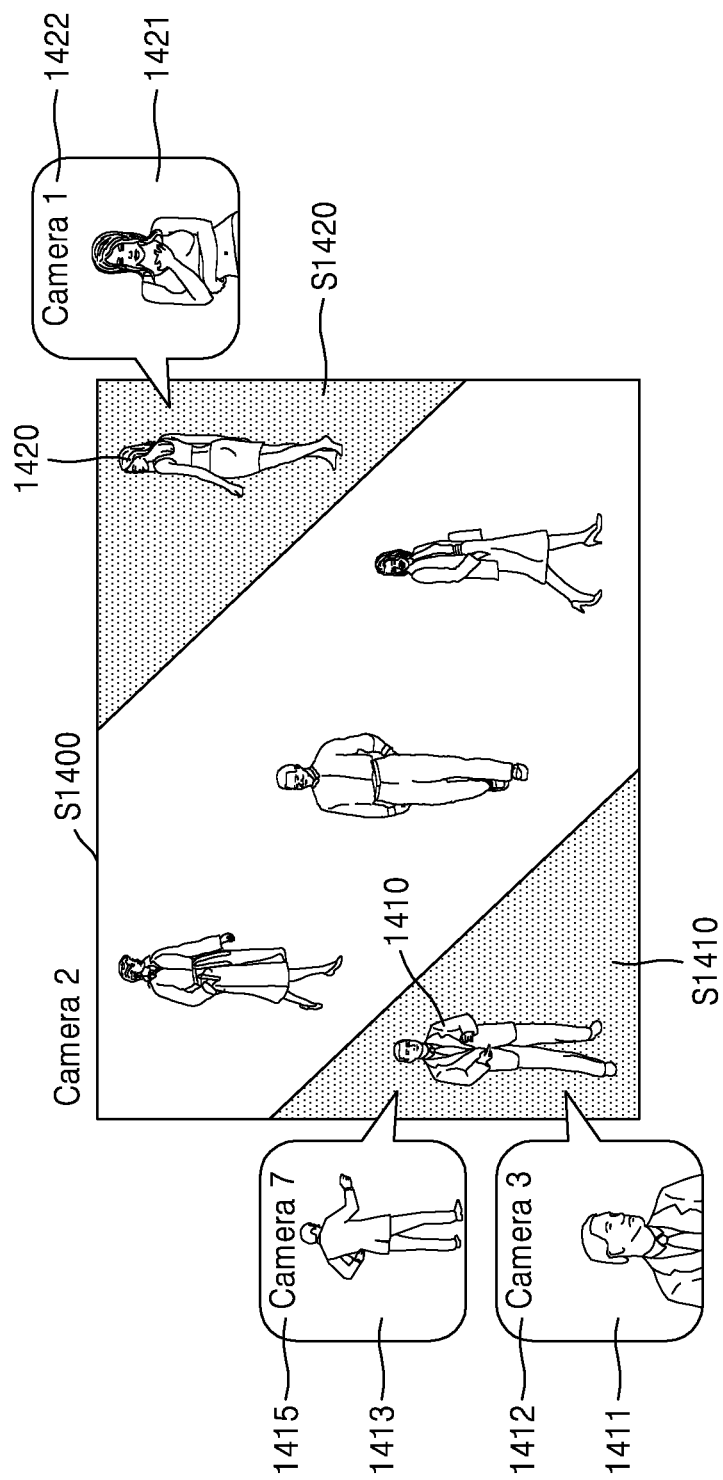

FIG. 14 shows a multi-video summary when a plurality of overlapping areas S1410 and S1420 are in a predetermined area S1400, according to an exemplary embodiment.

FIG. 14 shows an exemplary embodiment of a multi-video summary of a video captured by a second camera. FIG. 14 shows two overlapping areas S1410 and S1420. Also, in a first overlapping area S1410, areas captured by the second camera, a third camera, and a seventh camera may be partially overlapping one another. The second overlapping area S1420 may be where areas captured by a first camera and the second camera overlap each other.

Referring to the multi-video summary of FIG. 14, the first overlapping area S1410 shows a video summary based on a video of a person 1410 captured by the second camera.

Also, a video summary 1411 based on a video of the person 1410 captured by the third camera nearby the second camera in the first overlapping area S1410 in a different FOV from the second camera is displayed with a notification message 1412 indicating that the video is captured by the third camera.

Also, a video summary 1413 based on a video of the person 1410 captured by the seventh camera nearby the second camera in the first overlapping area S1410 in a different FOV from the second camera is displayed with a notification message 1415 indicating that the video is captured by the seventh camera.

In this case, the videos respectively captured by the third camera and the seventh camera may be sequentially displayed with a time interval. Alternatively, the videos may be shown as a panorama. Alternatively, a video, in which a feature to be identified is highlighted the most, may be enlarged. Examples of the feature to be identified may include fire, eyes, a nose, and a face.

According to another exemplary embodiment, from among a plurality of imaging devices that capture the first overlapping area S1410, at least one of the second, third, and seventh cameras that have the same FOV may generate a video summary at an identical time range and display the video summary together when the user requests. Also, at least one of the second, third, and seventh cameras may reproduce a corresponding part of an original video using synchronized time stamp information when an object in the generated video summary is clicked, simultaneously with another at least one video clip for the overlapping area at the identical time range. The other at least one video clip is recorded and derived from the imaging devices with the overlapping FOV, which have generated a video summary for the overlapping area.

A second overlapping area S1420 shows a video summary based on a video of a person 1420 captured by the second camera. In this case, the second overlapping area S1420 may display a video summary 1421 based on a video of the person 1420 captured by the first camera nearby the second camera in a different FOV from the second camera in the second overlapping area S1420 and/or a notification message 1422 indicating that the video is captured by the first camera.

Figure 15:
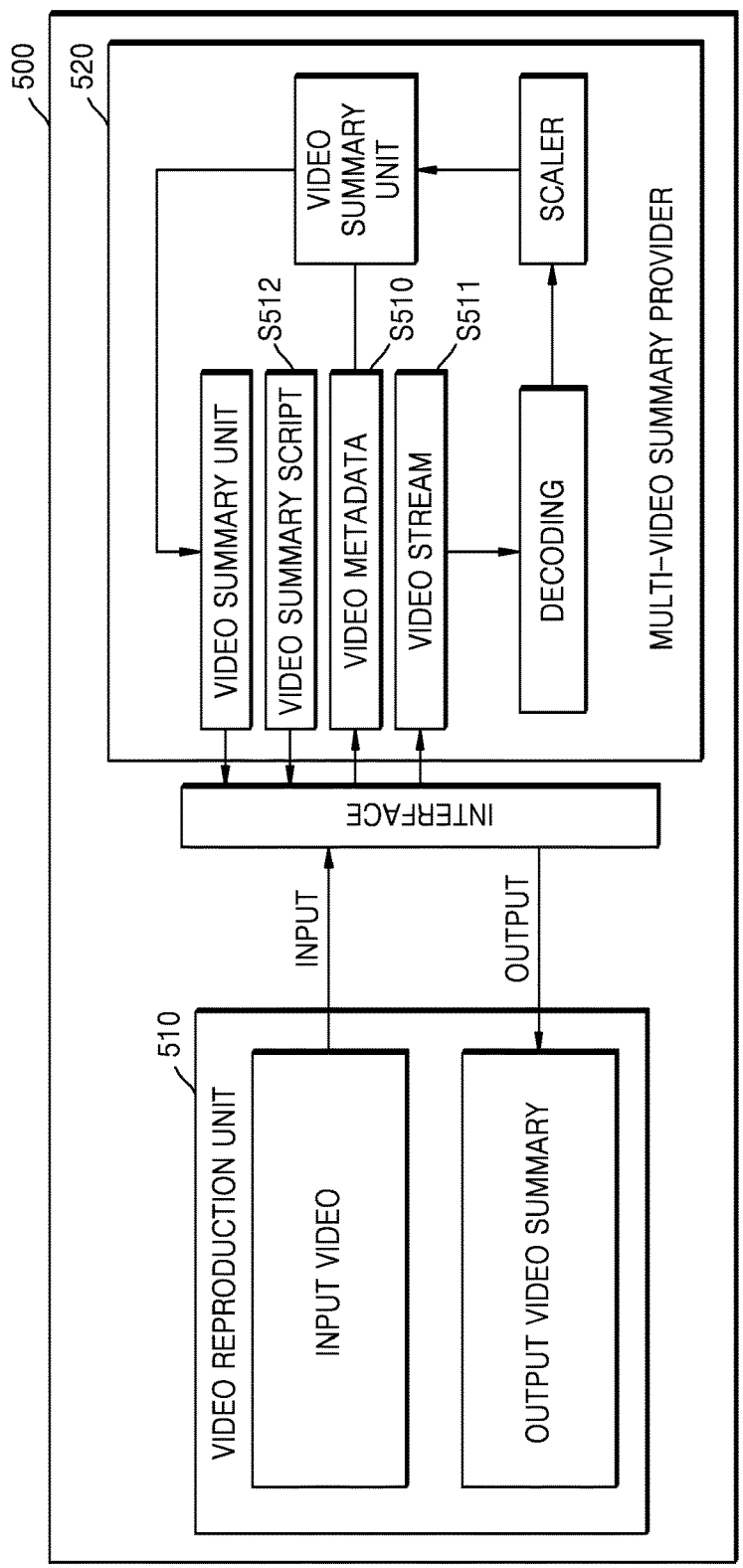
FIG. 15 is a block diagram of a multi-video summary providing apparatus, according to another exemplary embodiment.
Figure 16:
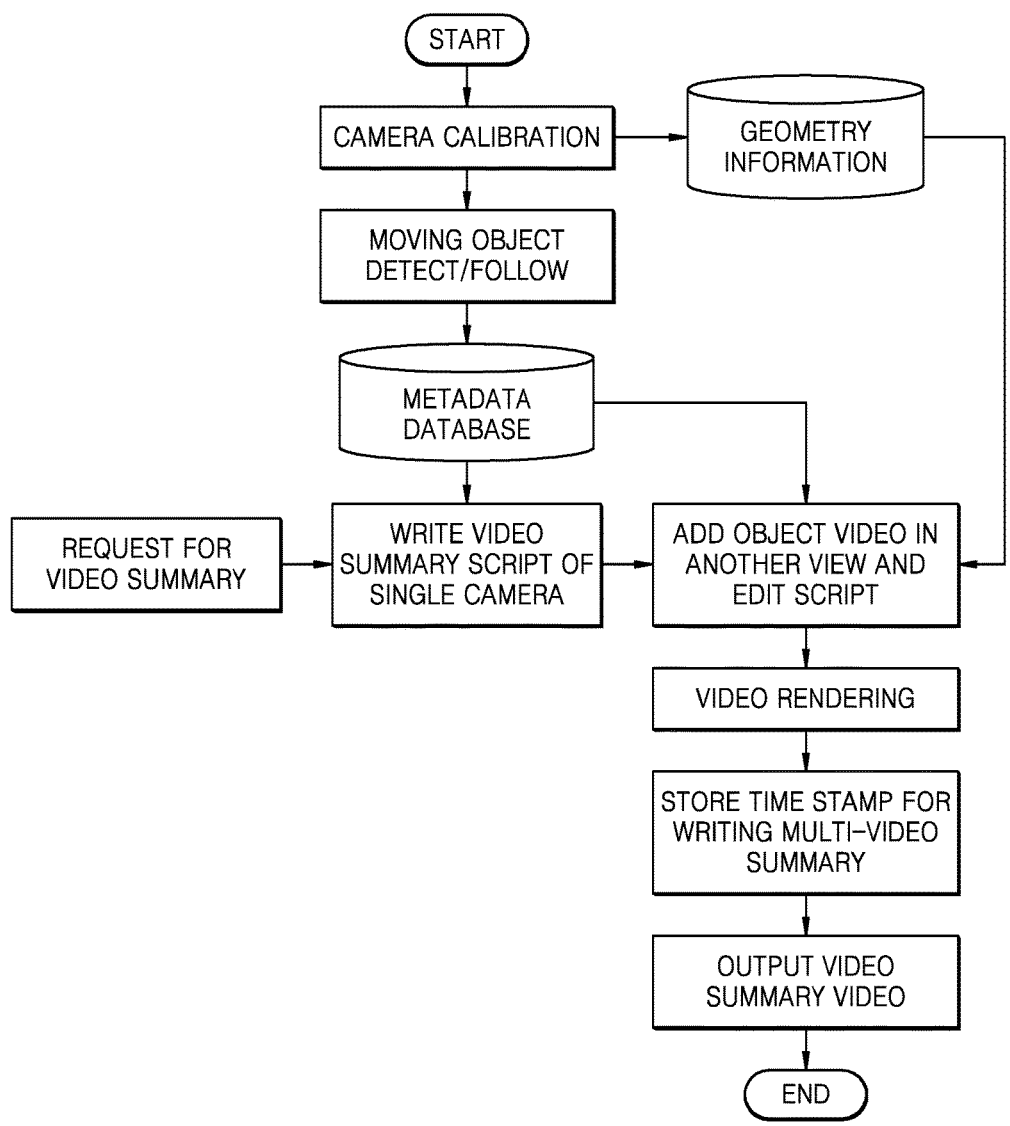
FIG. 16 is a flowchart of a method of providing a multi-video summary, according to an exemplary embodiment.

FIG. 15 is a block diagram of a multi-video summary providing apparatus 500, according to another exemplary embodiment. FIG. 16 is a flowchart of a method of providing a multi-video summary, performed by the multi-video summary providing apparatus 500. The exemplary embodiment will be described below with reference to FIGS. 15 and 16.

The multi-video summary providing apparatus 500 may be provided along with at least one camera installed at necessary locations in a monitoring area, for example, front, back, left, right, or inside. Thereafter, calibration is performed on the plurality of cameras to obtain geometry information and calculate an overlapping area between videos of the cameras.

Thereafter, video metadata S510 is generated by analyzing video data (or video stream) S511 from the cameras by using a multi-video summary unit 520. In this case, the video metadata S510 may include information such as moving object detection and detected time, moving path of an object, color/shape of the object, and changes in the object.

When a video summary request is input, the multi-video summary providing apparatus 500 may generate a video summary script S512 to generate a video summary. The video summary script S512 includes, for example, a location of an object and time information.

According to an exemplary embodiment, the multi-video summary providing apparatus 500 may, first, generate a video summary script about a predetermined camera, and then add a video summary script so as to additionally use a portion of a video captured by another camera at a different angle. The portion of the video covers an overlapping area where an FOV of the other camera overlaps that of the predetermined camera.

The multi-video summary providing apparatus 500 may generate a video summary script file about the overlapping area by using time stamp information, and render a video. In the case of an object detected by the cameras, time stamp information is stored for simultaneous reproduction, and then a final video is output.

Figure 17:
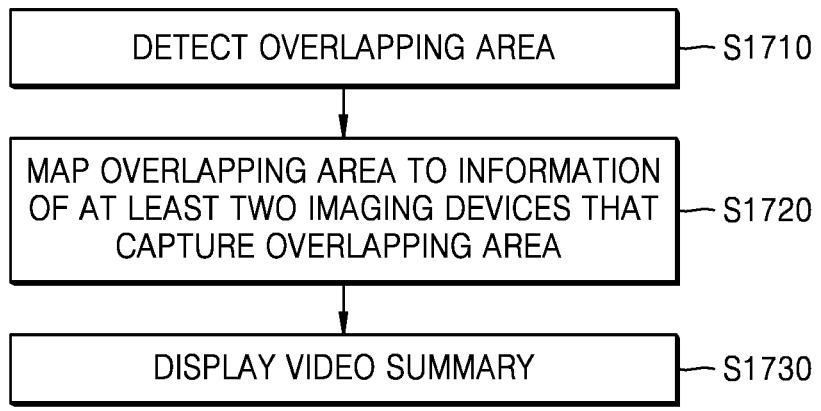
FIG. 17 is a flowchart of a method of providing a multi-video summary, the method being performed by a multi-video summary providing apparatus, according to an exemplary embodiment.

FIG. 17 is a flowchart of a method of providing a multi-video summary, according to an exemplary embodiment.

A multi-video summary providing apparatus may perform calibration on a plurality of cameras installed at a plurality of locations, respectively, in a monitoring area, and thus obtain geometry information and information about an overlapping area between videos of the cameras. Through this process, the multi-video summary providing apparatus may determine an area monitored by each of the cameras, and detect an overlapping area when the areas monitored by the cameras overlap one another (S1710).

Next, the detected overlapping areas may be mapped to information about at least two imaging devices that capture the overlapping areas (S1720). Thereafter, when providing a video summary of each of the overlapping areas, as shown in FIGS. 5 and 7 to 14, a multi-video summary, which is generated based on videos captured by the cameras, may be simultaneously provided on a display screen (S1730). When a moving object has been detected in an overlapping area, a user may receive a video summary that is generated by using videos of the moving object captured by various cameras in different FOVs.

Figure 18:
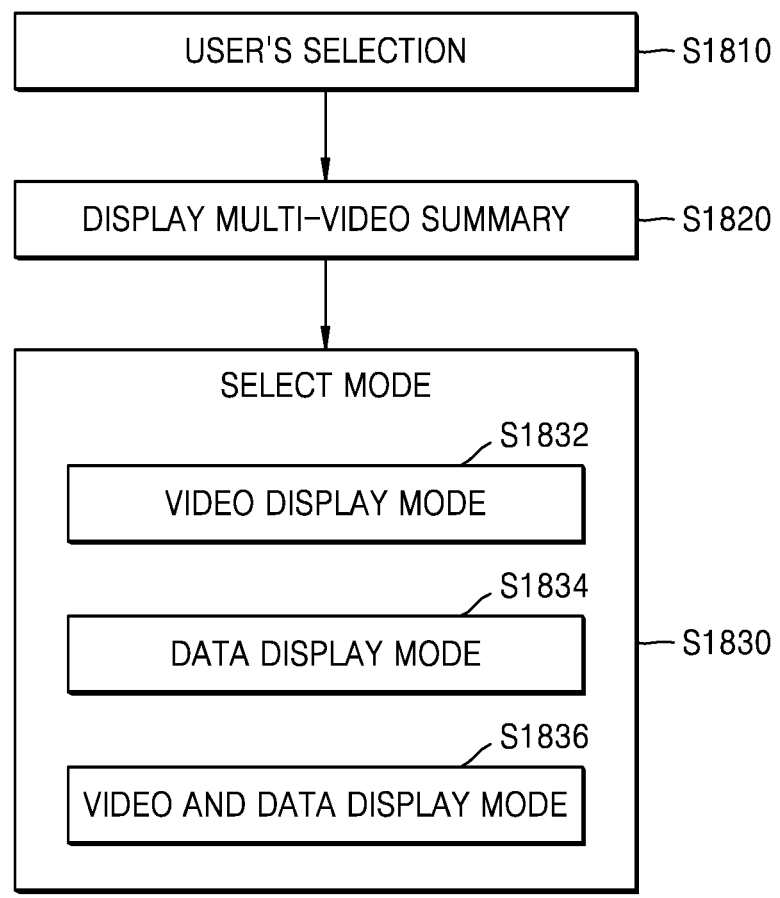
FIG. 18 is an exemplary diagram of selecting a mode when a multi-video summary is provided, according to an exemplary embodiment.

FIG. 18 is an exemplary diagram of receiving input information from a user via a user interface, when a multi-video summary is displayed, according to an exemplary embodiment.

A multi-video summary providing apparatus may support a user interface that allows a user to select a multi-video summary or a single video summary generated based on a video captured by a predetermined camera (S1810). In this case, the user interface may be provided to the user via a display screen.

When the user selects the multi-video summary (S1810), the multi-video summary providing apparatus enters a multi-video summary display mode, and additionally provides a mode selection interface to the user (S1820).

In this case, the mode selection interface may provide a video display mode S1832, a data display mode S1834, and a video and data display mode S1836.

In the video display mode S1832, as in the exemplary embodiments of FIGS. 3, 4, and 13, the multi-video summary providing apparatus additionally displays, in the multi-video summary, a video summary generated based on a video of an overlapping area captured by another camera.

In the data display mode S1834, as in the exemplary embodiments of FIGS. 7 and 8, the multi-video summary providing apparatus additionally displays, in the multi-video summary, a notification message indicating the number of videos of an overlapping area captured by at least one other camera or information about the at least one other camera that is capturing the overlapping area.

In the video and data display mode S1834, as in the exemplary embodiment of FIG. 14, the multi-video summary providing apparatus displays the multi-video summary together with a video or a video summary of an overlapping area captured by another camera, and additionally displays a notification message indicating the number of videos of the overlapping area captured by the other camera or information of the other camera that is capturing the overlapping area.

In the above-described exemplary embodiments, video summaries are generated and stored by respective cameras before being provided to a display device (not shown) by the multi-video summary providing apparatus. However, the inventive concept is not being limited thereto. The video summaries may be generated and stored by a separate device such as a DVR or NVR having a storage (not shown).

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 2 and 15 may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of providing a multi-video summary, the method comprising:

setting up a plurality of imaging devices to monitor, in different fields of view (FOVs), a plurality of areas comprising at least one overlapping area commonly monitored by the plurality of imaging devices, and capture a plurality of videos from the plurality of areas, respectively, wherein the different FOVs of the plurality of imaging devices are at least vertically different from each other;

storing overlapping information in which the plurality of imaging devices and the at least one overlapping area are mapped to one another to indicate that objects respectively detected in the at least one overlapping area by the plurality of imaging devices are identical to one another; and providing at least two video summaries which are generated from the plurality of videos and display at least two images of an identical object in the at least one overlapping area captured by at least two imaging devices among the plurality of imaging devices in the different FOVs, based on the overlapping information, wherein the at least two video summaries are provided in one of:

a video display mode displaying a first video summary of a first video captured by at least one first imaging device and a second video summary of a second video only for the at least one overlapping area captured by a second imaging device;

a data display mode displaying the first video summary and a notification message indicating presence of a video clip for the at least one overlapping area captured by the second imaging device or information about the second imaging device; and
a video and data display mode displaying the first video summary and the second video summary along with the notification message.

2. The method of claim 1, wherein the providing the two video summaries comprises displaying, on a single screen of a display, the two video summaries which respectively show at least one image of the object detected in the at least one overlapping area, the two video summaries being generated from at least two videos captured by the two imaging devices.

3. The method of claim 2, wherein, when the two video summaries are displayed on the single screen, the two video summaries are synchronized in time to indicate that an image of the object shown in a first video summary and an image of the object shown in a second video summary are captured at a same time.

4. The method of claim 1, further comprising displaying, on a single screen of a display, a first video summary which shows a plurality of first images of the object detected in the at least one overlapping area by a first imaging device with a first FOV; and
displaying at least one second video summary comprising at least one second image of the object detected in the at least one overlapping area by at least one second imaging device with at least one second FOV, in response to selecting at least one image of the first images or indication of the image of the first images.

5. The method of claim 4, wherein the selected image of the first images and the second image are captured by the first imaging device and the second imaging device, respectively, at the same time.

6. The method of claim 4, further comprising indicating presence of the second image of the object captured by the second imaging device in a storage when the first video summary is displayed.

7. The method of claim 6, wherein the presence of the second image is indicated by at least one of information about a number of the second imaging device that captures a video of the at least one overlapping area and information about identifiers of the second imaging device that captures the video of the at least one overlapping area.

8. The method of claim 1, wherein the two video summaries are provided by mapping a first video summary of the at least one overlapping area generated by a first imaging device among the plurality of imaging devices to at least one second video summary of the at least one overlapping area generated by at least one second imaging device among the plurality of imaging devices based on time stamp information.

9. The method of claim 1, further comprising, in response to selecting an image included in a first video summary of the two video summaries, displaying an original video among the plurality of videos, corresponding to the image, captured by a first imaging device among the plurality of imaging devices.

10. A multi-video summary providing apparatus comprising:
a field of view (FOV) information storage configured to store information about at least one overlapping area commonly monitored by a plurality of imaging devices among a plurality of areas monitored by the plurality of imaging devices having different FOVs about the at least one overlapping area, wherein the different FOVs of the plurality of imaging devices are at least vertically different from each other; and
at least one processor configured to implement:
a mapping unit configured to store overlapping information in which the plurality of imaging devices and the at least one overlapping area are mapped to one another to indicate that objects respectively detected in the at least one overlapping area by the plurality of imaging devices are identical to one another; and
a multi-video summary provider configured to provide at least two video summaries which are generated from videos and display at least two images of an identical object in the at least one overlapping area captured by at least two imaging devices among the plurality of imaging devices in the different FOVs, based on the overlapping information,
wherein the at least two video summaries are provided in one of:
a video display mode displaying a first video summary of a first video captured by at least one first imaging device and a second video summary of a second video only for the at least one overlapping area captured by a second imaging device;
a data display mode displaying the first video summary and a notification message indicating presence of a video clip for the at least one overlapping area captured by the second imaging device or information about the second imaging device; and
a video and data display mode displaying the first video summary and the second video summary along with the notification message.

11. The apparatus of claim 10, wherein the multi-video summary provider is configured to display, on a single screen of a display, the two video summaries which respectively show at least one image of the object detected in the at least one overlapping area, the two video summaries being generated from at least two videos captured by the two imaging devices.

12. The apparatus of claim 11, wherein, when the two video summaries are displayed on the single screen, the multi-video summary provider is configured to synchronize the two video summaries in time to indicate that an image of the object shown in a first video summary and an image of the object shown in a second video summary are captured at a same time.

13. The apparatus of claim 10, wherein the multi-video summary provider is configured to display, on a single screen of a display, a first video summary which shows a plurality of first images of the object detected in the at least one overlapping area by a first imaging device with a first FOV, and at least one second video summary comprising at least one second image of the object detected in the at least one overlapping area by at least one second imaging device with at least one second FOV, in response to at least one image of the first images or indication of the image of the first images.

14. The apparatus of claim 13, wherein the selected image of the first images and the second image are captured by the first imaging device and the second imaging device, respectively, at the same time.

15. The apparatus of claim 13, wherein the multi-video summary provider is further configured to indicate presence of the second image of the object captured by the second imaging device in a storage when the first video summary is displayed.

16. The apparatus of claim 15, wherein the multi-video summary provider is configured to indicate the presence of the second image by at least one of information about a number of the second imaging device that captures a video of the at least one overlapping area and information about identifiers of the second imaging device that captures the video of the at least one overlapping area.

17. The apparatus of claim 10, wherein the multi-video summary provider is configured to provide the two video summaries by mapping a first video summary of the at least one overlapping area generated by a first imaging device among the plurality of imaging devices to at least one second video summary of the at least one overlapping area generated by at least one second imaging device among the plurality of imaging devices based on time stamp information.

18. The apparatus of claim 10, wherein the multi-video summary provider is further configured to, in response to selecting an image included in a first video summary of the two video summaries, display an original video among the videos, corresponding to the image, captured by a first imaging device among the plurality of imaging devices.

* * * * *